Sept. 17, 1957     J. W. BONQUET     2,806,567
AIR CLUTCH
Filed Jan. 15, 1954     2 Sheets-Sheet 1
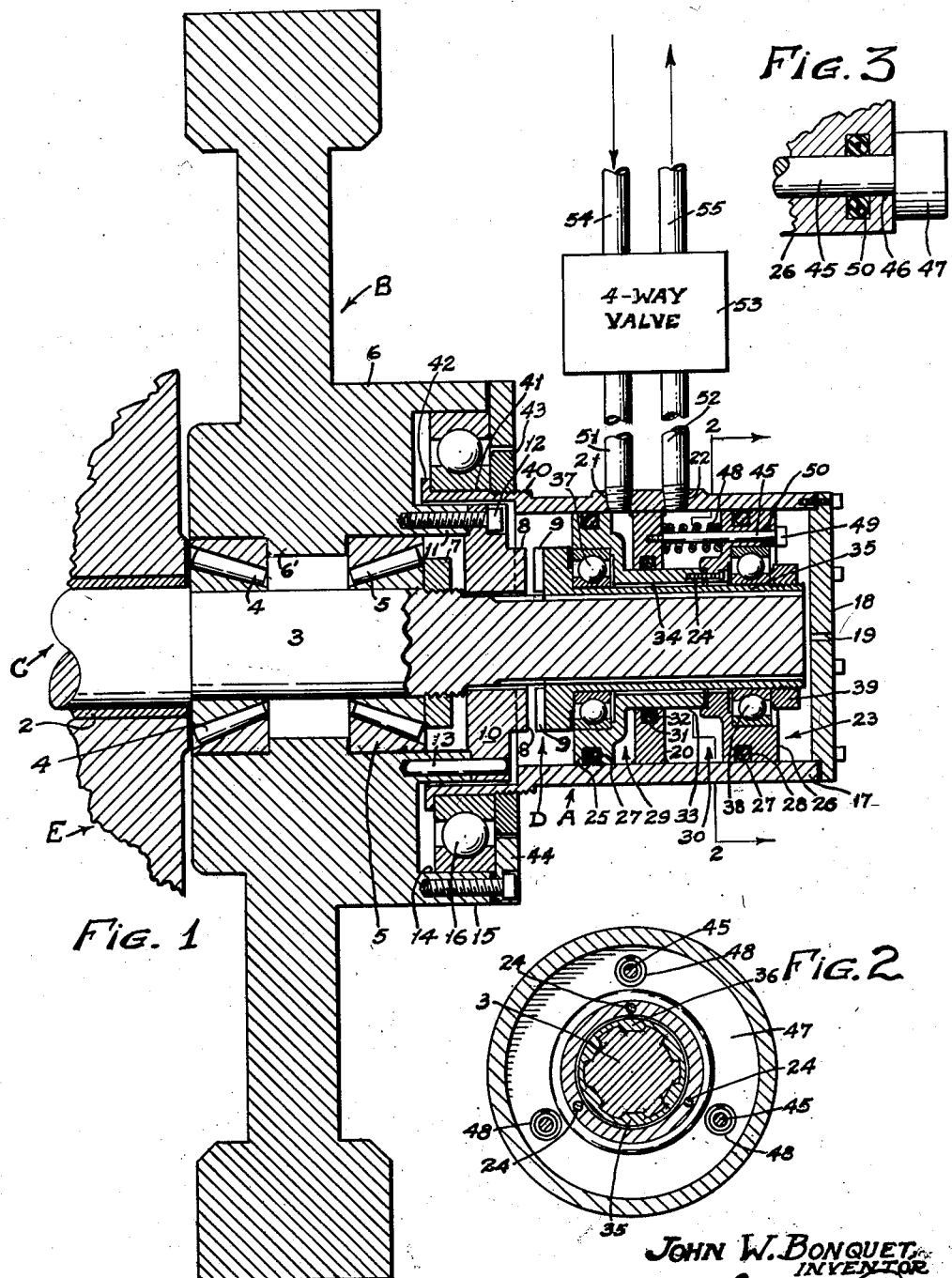

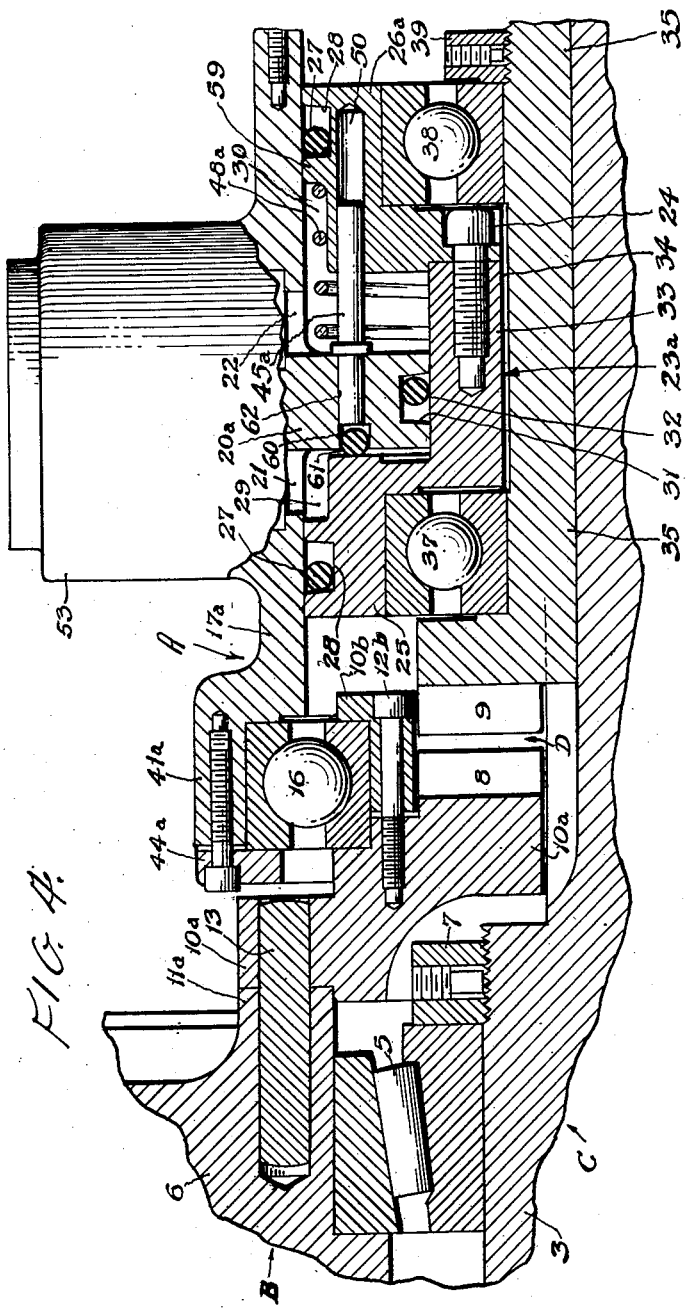

2,806,567

AIR CLUTCH

John W. Bonquet, Glendale, Calif., assignor to Diamond Machine Tool Company, Pico, Calif., a corporation of California Application January 15, 1954, Serial No. 404,159

9 Claims. (Cl. 192—85)

This invention relates to an air clutch which may be employed for general use wherever a clutch is desired to establish intermittent driving connection between a driving and a driven member. I have shown the clutch as it may be used to provide driving connection to a flywheel, such as may be employed on a punch press.

The object of the invention is to provide an air operated clutch which, while supported upon a rotating member, has a simple direct connection between the clutch cylinder and the source of air pressure for operating the clutch.

In general, the invention provides an air operated clutch which employs a stationary clutch cylinder having an annular bearing retainer surface for deriving support from a rotating driving member, such as a flywheel.

More specifically, the invention contemplates a clutch which includes a stationary cylinder that is carried by a rotating member such as a drive wheel, and has an annular partition member fixed therein, an annular piston with a reduced hub portion which is piloted for reciprocation with an axial bore in the partition member, and a driven clutch member which projects axially through the piston and is rotatable therein while axially movable along with the piston.

Other objects will become apparent in the ensuing specifications and appended drawings in which:

Fig. 1 is an axial sectional view of the clutch with a four way control valve shown schematically;

Fig. 2 is a cross-sectional view thereof taken on the line 2—2 of Fig.1;

Fig. 3 is an enlarged fragmentary detail view; and

Fig. 4 is a fragmentary axial secitonal view of a modified form of the invention.

I have shown the clutch asembly A associated with a flywheel B which drives the driven shaft C (e. g. crankshaft) when the clutch jaws D are engaged, the driven shaft shaft C being rotatably supported by a fixed support E (e. g., the frame of a punch press).

The fixed support E has a bearing such as the bushing 2 within which the driven shaft C rotates, the driven shaft and flywheel receiving their principal lateral support from the support E. The driven shaft has a reduced portion 3 on which the inner races of tapered roller bearings 4 and 5 are mounted, the outer bearing races being mounted in the flywheel hub 6. The flywheel is thus rotatably mounted and supported on the driven shaft. An internal radial flange 6' in hub 6 presents axially opposed shoulders against which the bearings 4, 5 are engaged, a nut 7 being threaded onto the driven shaft for retaining the bearings in place. A driving clutch member 8 has conventional jaws which mesh with jaws on the driven clutch member 9 when the clutch is engaged, the clutch being shown in disengaged position in Fig. 1. It will be understood that the clutch may be of a type other than the jaw type shown, e. g., a friction type. The driving clutch member 8 has an annular body 10 which is anchored at its periphery, by means of bolts 12 and dowel pin 13, to a cylindrical flange 11 on the flywheel B.

The hub 6 has a counterbore 14 defined between flange 11 and a peripheral flange 15. A bearing 16 is mounted in counterbore 14. The clutch asembly is housed in a cylinder 17 which is provided with a cap 18 closing the outer end thereof, the cap having a breather opening 19. A flat ring 20 is anchored within the casing, as by welding, to constitute an annular partition between the air inlet and outer openings 21, 22.

A piston, designated generally by the numeral 23, is comprised of two sections to permit assembly thereof by inserting the piston sections into opposite ends of the casing, said sections being then fixed together by bolts 24. The assembled piston has annular heads 25, 26 at its respective ends, each head being sealed to a respective cylindrical inner wall of the cylinder 17, by an O-ring 27, mounted in an annular groove 28 in the respective head. The annular partion 20 functions to divide the annular space defined between heads 25, 26 into annular chambers 29, 30. An annular groove 31 in the inner wall of partition 20 accommodates an O-ring 32 to provide an effective seal between the partition 20 and the externally cylindrical hub 33 which is integral with piston head 25. The hub 33 is of sleeve form, having a bore 34 which receives the hub sleeve 35 of the driven clutch member 9, the sleeve 35 having internal longitudinal splines 36 (Fig. 2) coacting with corresponding splines on the driven shaft 3, thereby providing an axially movable driving connection between the clutch member 9 and the driven shaft 3.

A bearing 37 is mounted on the hub sleeve 35 and abuts the end face of the clutch member 9. A bearing 38 is mounted on the opposite end of the sleeve 35. At the ends of the axial bore 34, the piston 23 has counter-bores accommodating the bearings 37, 38. A nut 39 anchors the bearings and the piston assembly in place on the sleeve 35 so that the clutch member 9 moves axially in unison with the piston 23 and at the same time is free to rotate independently of the piston.

The cylinder 17 has an externally threaded portion 40 and an adjacent externally cylindrical skirt 41 whcih terminates with a radially outwardly projecting annular lip 42. The inner race of bearing 16 is piloted on the skirt 41 and a ring nut 43 anchors the race against the annular lip 42. A retainer ring 44 is fixed to the end face of annular flange 15 for retaining the outer race of bearing 16 within the annular recess 14. Thus the clutch cylinder 17 is carried by the rotatable flywheel in a manner such that it may be anchored in a stationary position. Retainer ring 44 and nut 43 lie in a common plane and cooperative with hub 6 to provide a housing for bearing 16 in counterbore 14.

The clutch jaws are maintained in a disengaged condition whenever the air pressure is off or fails for any reason. The means for accomplishing this include a plurality of guide pins 45 which are evenly spaced circumferentially (Fig. 2) and project through parallel axial bores 46 (Fig. 3) in piston head 26, radially outwardly of bearing 38. The pins 45 may be in the form of bolts, threaded into annular partition 20. A compression spring 48 is piloted on each pin 45 between the partition 20 and the piston head 26 to normally urge the piston head 26 away from the partition 20, as shown in Fig. 1, whereby the clutch jaws become disengaged. Pins 45 have heads 49 which abut the end face of the piston head 26 to limit the axial movement of the piston in clutch disengaging direction. The piston head 26 is free to slide axially upon guide pins 45 and small O-rings 50 in piston head 26 seal against escape of air from chamber 30 along the guide pins 45. Fig. 3 is an enlarged detail view to better illustrate this seal.

An air conduit 51 is threaded in port 21 to establish communication with chamber 29 and a similar conduit 52 communicates with chamber 30. A four-way valve 53, shown schematically in Fig. 1, may be employed to selectively control the admission of pressurized air through either of the conduits 51, 52, into the respective chamber 29 or 30, as the case may be, the other conduit in each instance serving as an outlet for discharging air from the other chamber. An inlet tube 54 is connected at one end to a source of air pressure (not shown) and at the other end is in communication with the four-way valve 53. An air discharge tube 55, likewise in communication with the valve 53, may optionally be utilized. Alternately, 55 may represent simply a discharge port in valve 53, open to atmosphere.

In the operation of the clutch, when it is designed to engage the clutch so as to impart rotation from the fly wheel B to shaft 3, the valve is shifted to establish communication between air inlet tube 54 and conduit 51, thereby admitting pressurized air into chamber 29—any air pressure in chamber 30 being discharged through conduit 52, valve 53 and discharge outlet 55. The air pressure in chamber 29 moves the piston 23 axially until the clutch jaws 8 and 9 are interengaged. To disengage the clutch the valve is rotated to bring air inlet tube 54 into communication with conduit 52 and at the same time bringing conduit 51 into communication with discharge outlet 55. Thus air pressure is introduced into chamber 30 while the air pressure in chamber 29 is being discharged therefrom through conduit 51. The piston is then moved to the position shown in Fig. 1 wherein the clutch jaws are disengaged from each other.

In the preferred form of the invention as shown in Fig. 4, the numerals as applied to the various parts in Figs. 1, 2 and 3 are to be considered applicable to like parts of Fig. 4. The annular clutch body 10a is anchored to the axially projecting hub portion 11a of the flywheel and drivingly connected thereto by means of one or more bolts 12 (Fig. 1) and a drive pin 13, disposed symmetrically about the clutch axis in registering bores in the flywheel band clutch body 10a. The clutch cylinder 17a has a rim portion 41a provided with a counterbore in which is mounted the outer race of the ball bearing 16, the annular cap 44a being secured to the clutch cylinder to hold the bearing in place. An annular ring 10b, secured to body 10a by screws 12b, serves as a retainer for the inner race of bearing 16. The piston head 26a is piloted for axial movement relative to the partition ring 20a on dowel pins 45a, three or more of which may be positioned equidistantly about the circumference of the piston head. A compression spring 48a abuts the annular flange portion 59 of the piston head 26a for urging the piston 23a in a direction axially away from the partition ring 20a. The partition ring 20a is provided with an annular groove 60 in the a side thereof and an O-ring 61 serves to seal off the open ends of the bores 62 in which the piloting pins 45a are received.

An advantage of the arrangement shown in Fig. 4 is the reduced diameter of bearing 16 as compared to its diameter in Fig. 1. Also, spring 48a is preferable to the series of springs 48 of Fig. 1.

I claim:

1. An air clutch for intermittently connecting a rotating fly wheel to a driven shaft extending through and journalled in said flywheel, comprising: an axially fixed driving clutch member attached to the flywheel and rotating therewith, with the driven shaft having an end portion projecting therethrough; a coacting clutch element having a hub sleeve mounted on said projecting end portion of the shaft, slidable thereon, and drivingly connected thereto, said clutch element being disposed adjacent said clutch member for clutching engagement therewith to be driven thereby; a piston having a sleeve-form hub surrounding said hub sleeve and including piston heads projecting radially outwardly from the respective ends of said hub; a stationary cylinder having a radially inwardly projecting annular partition disposed intermediate its ends and having, on respective sides of said partition, piston chambers in which said piston heads are respectively slidable in sealed relation to the inner walls of the cylinder, said partition being interposed between said piston heads and having an inner margin defining an opening through which said piston hub is slidably extended, said inner margin being sealed to the outer wall of said hub to define opposed fluid pressure chambers between the respective sides of said partition and said piston heads; connections for selectively delivering through the lateral wall member of said cylinder, into a respective one of said fluid pressure chambers, fluid under pressure for moving said piston axially to enclutch or declutch said driven clutch element with respect to said driving clutch member; and bearing means interposed between said piston and hub sleeve, providing a freely rotatable and axial movement transmitting connection between said hub sleeve and piston.

2. In combination with a flywheel adapted to be continuously driven, and a driven shaft extending through and journalled in said flywheel, an air clutch assembly for intermittently connecting said flywheel to said driven shaft, comprising an axially fixed driving clutch member attached to the flywheel and rotating therewith, with the driven shaft having an end portion projecting therethrough; a coacting clutch element having a hub sleeve mounted on said projecting end portion of the shaft, slidable thereon, and drivingly connected thereto, said clutch element being disposed adjacent said clutch member for clutching engagement therewith to be driven thereby; a piston having a sleeve-form hub surrounding said hub sleeve and including piston heads projecting radially outwardly from the respective ends of said hub; a stationary cylinder having a radially inwardly projecting annular partition disposed intermediate its ends and having, on respective sides of said partition, piston chambers in which said piston heads are respectively slidable in sealed relation to the inner walls of the cylinder, said partition being interposed between said piston heads and having an inner margin defining an opening through which said piston hub is slidably extended, said inner margin being sealed to the outer wall of said hub to define opposed fluid pressure chambers between the respective sides of said partition and said piston heads; connections for selectively delivering through the lateral wall member of said cylinder, into a respective one of said fluid pressure chambers, fluid under pressure for moving said piston axially to enclutch or declutch said driven clutch element with respect to said driving clutch member; and bearing means interposed between said piston and hub sleeve, providing a freely rotatable and axial movement transmitting connection between said hub sleeve and piston.

3. In combination with a flywheel adapted to be continuously driven, said flywheel having a hub provided with a counterbore in its outer end, and a driven shaft extending through and journalled in said hub and having an end portion projecting beyond said outer end of the hub; a stationary cylinder having an inner end portion extending into said counterbore; anti-friction bearing means in said counterbore, providing a journal connection between said cylinder inner end portion and the flywheel; and an air clutch assembly for intermittently connecting said flywheel to said driven shaft, comprising an axially fixed annular driving clutch member attached to the flywheel around said projecting shaft portion; a coacting clutch element disposed adjacent said clutch member and having a hub sleeve slidably mounted on and drivingly connected to said projecting shaft portion; a piston having a sleeve-form hub surrounding said hub sleeve and including piston heads projecting radially outwardly from the respective ends thereof; bearing means interposed between said piston and hub sleeve, providing a freely rotatable and axial movement transmitting connecting between said hub sleeve and piston; said cylinder including, intermediate its ends, a radially inwardly projecting annular partition having an inner margin defining an opening through which said piston hub projects, for sliding movement, said cylinder having, on respective sides of said partition, piston chambers in which said piston heads are axially slidable, the piston heads being sealed to the inner walls of said cylinder and said piston hub being sealed to said inner margin of the partition, thereby defining opposed fluid pressure chambers between opposite sides of said partition and said cylinder heads; and connections for selectively delivering through said cylinder into the respective piston chambers thereof, fluid under pressure for moving said piston axially in a selected direction to enclutch or declutch said clutch member and clutch element.

4. An air clutch mechanism for establishing a rotating driving connection between coaxial driving and driven members one of which is a shaft and the other of which is an annular member through which said shaft extends with a portion thereof projecting beyond said annular member, said air clutch mechanism including, in combination with said shaft, a stationary cylinder surrounding said shaft and having an end communicating with said annular member; a rotatable connection between said annular member and said cylinder end; an axially fixed clutch member secured to said annular member; a coacting clutch element disposed adjacent said clutch member and having a hub sleeve slidably mounted on and drivingly connected to said projecting shaft portion; a piston having a sleeve-form hub surrounding said hub sleeve and including piston heads projecting radially outwardly from the respective ends thereof; bearing means interposed between said piston and hub sleeve, providing a freely rotatable and axial movement transmitting connection between said hub sleeve and piston; said cylinder including, intermediate its ends, a radially inwardly projecting annular partition having an inner margin defining an opening through which said piston hub projects, for sliding movement, said cylinder having, on respective sides of said partition, piston chambers in which said piston heads are axially slidable, the piston heads being sealed to the inner walls of said cylinder and said piston hub being sealed to said inner margin of the partition, thereby defining opposed fluid pressure chambers between opposite sides of said partition and said cylinder heads; and connections for selectively delivering through said cylinder into the respective piston chambers thereof, fluid under pressure for moving said piston axially in a selected direction to enclutch or declutch said clutch member and clutch element.

5. An air clutch as defined in claim 4, wherein said piston heads include rim portions projecting axially from the ends of said piston hub and offset radially outwardly from said hub sleeve to define annular spaces; said bearing means comprising a pair of antifriction bearings each disposed within a respective one of said annular spaces.

6. An air clutch as defined in claim 5, wherein one of said bearings has an inner race abutted against the back of said clutch element; and a retainer element anchored to said hub sleeve at its end opposite said clutch element and engaging the inner race of the other bearing, said bearings having outer races abutted against said piston heads and cooperating with said clutch element and retainer element to establish said axial movement transmitting connection through said bearings.

7. An air clutch as defined in claim 6, wherein said inner margin of the partition has an annular groove therein; wherein said piston head rims have annular grooves therein; and including O-rings seated in said grooves and sealed respectively against the outer wall of said hub sleeve and the inner walls of the cylinder.

8. An air clutch as defined in claim 4, including guide pins mounted in the annular partition, slidably extended through the piston head remote from said clutch element, and having at their outer ends, heads providing stops for abutment against the outer side of said remote piston head, to limit the movement of said clutch element in de-clutching direction; and coil springs encircling said guide pins and engaged under compression between said partition and said remote piston head, for effecting declutching action in the event of failure of fluid pressure.

9. An air clutch comprising: a cylinder having, intermediate its ends, a radially inwardly projecting annular partition and having piston chambers on respective sides of said partition; a piston comprising a sleeve-form hub having a peripheral wall sealed to the inner margin of said partition in sliding relation thereto, and annular piston heads attached to the respective ends of said hub, projecting radially outwardly therefrom, and sealed to the inner wall of said cylinder within the respective piston chambers; a clutch element having a hub sleeve projecting into said piston; bearing means interposed between said piston and hub sleeve, providing a freely rotatable and axial movement transmitting connection between said hub sleeve and piston, a coacting clutch member axially fixed in a position to be engaged by said clutch element; and connections to the respective piston chambers for transmitting thereto, selectively, fluid under pressure for shifting said piston toward said clutch member to move said clutch element into clutching engagement with said clutch member, and, alternatively, for shifting said piston away from said clutch member for declutching.

References Cited in the file of this patent

UNITED STATES PATENTS

| 2,205,989 | Meyers et al. | June 25, 1940 |
| 2,393,835 | Stevenson | Jan. 29, 1946 |

FOREIGN PATENTS

| 674,624 | Great Britain | June 25, 1952 |